US009848067B2

(12) United States Patent
Sankaran

(10) Patent No.: US 9,848,067 B2
(45) Date of Patent: Dec. 19, 2017

(54) MANAGING SEQUENCE VALUES WITH ADDED HEADERS IN COMPUTING DEVICES

(71) Applicant: Cisco Technology, Inc., San Jose, CA (US)

(72) Inventor: Ganesh Chennimalai Sankaran, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 14/309,454

(22) Filed: Jun. 19, 2014

(65) Prior Publication Data

US 2015/0312384 A1 Oct. 29, 2015

(30) Foreign Application Priority Data

Apr. 25, 2014 (IN) .............................. 491/KOL/2014

(51) Int. Cl.
*G06F 15/16* (2006.01)
*H04L 12/56* (2006.01)
(Continued)

(52) U.S. Cl.
CPC .......... *H04L 69/163* (2013.01); *H04L 67/141* (2013.01); *H04L 67/2804* (2013.01); *H04L 69/22* (2013.01)

(58) Field of Classification Search
CPC ........ H04L 69/163; H04L 69/22; H04L 69/16
(Continued)

(56) References Cited

U.S. PATENT DOCUMENTS 6,389,462 B1* 5/2002 Cohen .................... H04L 29/06
707/999.01
6,976,085 B1 12/2005 Aviani et al.
(Continued)

FOREIGN PATENT DOCUMENTS

EP          1 011 244 A2   6/2000
WO    WO2015/164079 A1   10/2015

OTHER PUBLICATIONS

European Patent Office, "Search Report" in application No. PCT/US2015/024930, dated Jul. 21, 2015, 12 pages.
(Continued)

*Primary Examiner* — Kevin Bates
*Assistant Examiner* — Golam Mahmud
(74) *Attorney, Agent, or Firm* — Hickman Palermo Becker Bingham LLP

(57) ABSTRACT

In one embodiment, the disclosure provides a data processing method comprising receiving, from a client computer, a first handshake message segment comprising a first client sequence value; sending to a server computer a second handshake message segment comprising a second client sequence value equal to the first client sequence value less an added data length value; receiving a third handshake message segment from the client computer and sending a fourth handshake message segment to the server computer and determining that connections to the client computer and the server computer have reached established states; receiving from the client computer a first data segment comprising a first data length value; forming a second data segment that comprises: payload data from the first data segment; added data that is equal in size to the added data length value; and a second data length value equal to a sum of the first data length value and the added data length value; sending the
(Continued)

second data segment to the server computer; wherein the method is performed using one or more computing devices.

25 Claims, 5 Drawing Sheets

(51) Int. Cl.
    *H04L 1/18*     (2006.01)
    *H04L 29/06*     (2006.01)
    *H04L 29/08*     (2006.01)

(58) Field of Classification Search
    USPC ........................................................ 709/203
    See application file for complete search history.

(56) References Cited

U.S. PATENT DOCUMENTS

| | | | | |
|---|---|---|---|---|
| 7,607,062 | B2* | 10/2009 | Grove | H04L 47/10 370/474 |
| 7,987,271 | B1 | 7/2011 | O'Toole et al. | |
| 9,154,468 | B2* | 10/2015 | du Toit | H04L 63/0428 |
| 9,219,781 | B2* | 12/2015 | Prakash | H04L 61/1511 |
| 9,319,476 | B2* | 4/2016 | Joachimpillai | H04L 69/08 |
| 2002/0059428 | A1* | 5/2002 | Susai | H04L 67/1008 709/227 |
| 2004/0006643 | A1* | 1/2004 | Dolson | H04L 29/06 709/246 |
| 2006/0039295 | A1* | 2/2006 | Sturrock | H04L 47/10 370/252 |
| 2007/0025374 | A1* | 2/2007 | Stefan | H04L 63/0227 370/401 |
| 2007/0195792 | A1* | 8/2007 | Chen | H04L 47/10 370/395.52 |
| 2007/0245409 | A1* | 10/2007 | Harris | H04L 63/0272 726/5 |
| 2007/0283429 | A1* | 12/2007 | Chen | H04L 63/0254 726/11 |
| 2011/0141904 | A1* | 6/2011 | Viger | H04L 47/196 370/241 |
| 2013/0275617 | A1* | 10/2013 | Rajan | H04L 47/32 709/233 |
| 2013/0304892 | A1* | 11/2013 | Afergan | H04L 69/16 709/223 |
| 2014/0108513 | A1* | 4/2014 | Susai | H04L 29/06 709/203 |
| 2014/0122578 | A1* | 5/2014 | Lee | H04L 67/42 709/203 |
| 2014/0258465 | A1* | 9/2014 | Li | H04L 67/02 709/219 |
| 2014/0304399 | A1* | 10/2014 | Chaudhary | H04L 41/5009 709/224 |
| 2014/0304798 | A1* | 10/2014 | Iyengar | H04L 63/1458 726/11 |

OTHER PUBLICATIONS

European Claims in application No. PCT/US2015/024930, dated Jul. 2015, 6 pages.

* cited by examiner

MANAGING SEQUENCE VALUES WITH ADDED HEADERS IN COMPUTING DEVICES

BENEFIT CLAIM

This application claims the benefit under 35 U.S.C. 119 of India application 491/KOL/2014, filed Apr. 25, 2014, the entire contents of which are hereby incorporated by reference for all purposes as if fully set forth herein.

FIELD OF THE DISCLOSURE

The present disclosure generally relates to internetworking devices such as switches and routers that use transport control protocol (TCP). The disclosure relates more specifically to techniques for managing sequence values when headers or other data are added to packets during transmission.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Providers of internetworking services, termed service providers, have worked with vendors of internetworking equipment such as routers and switches to develop the capability to add headers and header data to packets passing through the routers and switches in the service providers' networks. For example, assume that a client computer is coupled to a content server computer through an internet service provider (ISP), and the ISP network has numerous routers and/or switches that are interposed in a logical packet communication path between the client computer and content server. In some situations, when the ISP receives a packet from the client computer that requests content from the content server, the ISP may insert, at one of the routers or switches, one or more headers and header values that are capable of recognition by the content server computer. Based upon terms of service between the ISP and the owner/operator of the content server computer, a different level of service may be provided to the client computer, based upon values in the added headers, by either other elements in the ISP network or by the content server computer.

Adding headers to packets along a path in the ISP network has the advantage of not requiring the ISP to store state data within the network. However, adding headers to the packets increases the total number of bytes communicated between client computer and server computer; therefore, adding headers has the disadvantage of requiring changing the sequence values that the client computer and content server computer maintain under standard provisions of transport control protocol (TCP), because the sequence values reflect the number of bytes that are exchanged.

In one approach, every message communicated between the client computer and content server computer after the addition of a header would require modification of the TCP sequence values in packet headers, even when the subsequent messages do not incur any other subsequent modification. Consequently, an approach of modifying every subsequent message would require significant processing resources. It would also require storing some form of state data indicating which flows had packets with added headers requiring sequence number management. Such an approach would be impractical for implementation in wire-speed internetworking elements that perform substantive action upon relatively few packets of a flow and only perform accounting operations with respect to the vast majority of the packets of the flow, as it would unnecessarily slow down such a device.

SUMMARY

The appended claims may serve as a summary of the invention.

DETAILED DESCRIPTION OF EXAMPLE EMBODIMENTS

Figure 1:
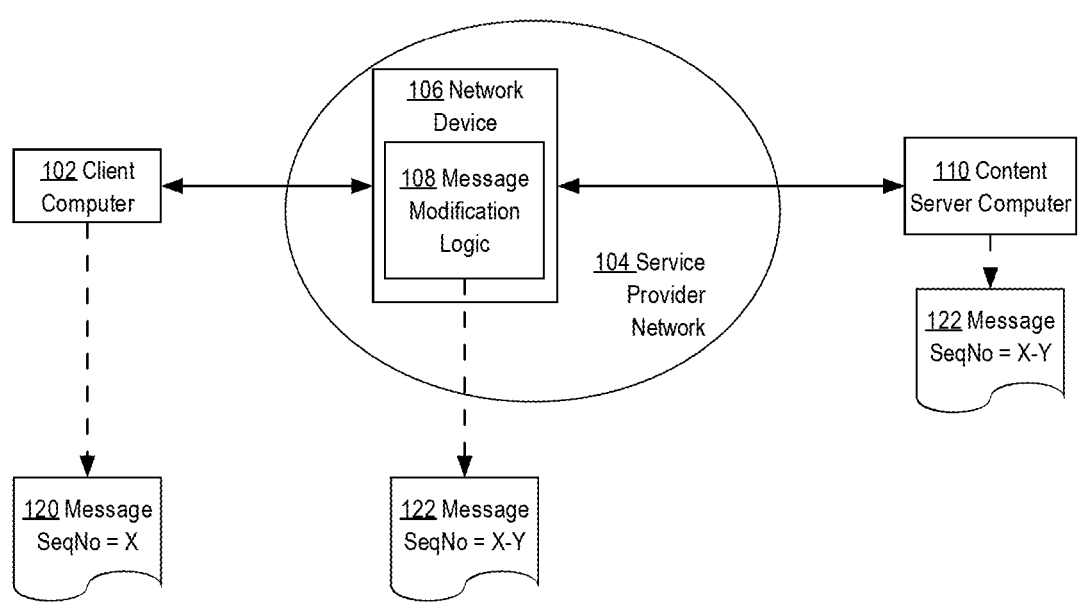
FIG. 1 illustrates a network context in which embodiments may be used.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. Overview

In one embodiment, the disclosure provides a data processing method comprising receiving, from a client computer, a first handshake message segment comprising a first client sequence value; sending to a server computer a second handshake message segment comprising a second client sequence value equal to the first client sequence value less an added data length value; receiving a third handshake message segment from the client computer and sending a fourth handshake message segment to the server computer and determining that connections to the client computer and the server computer have reached established states; receiving from the client computer a first data segment comprising a first data length value; forming a second data segment that comprises: payload data from the first data segment; added data that is equal in size to the added data length value; and a second data length value equal to a sum of the first data length value and the added data length value; sending the second data segment to the server computer; wherein the method is performed using one or more computing devices.

In another embodiment, the disclosure provides a data processing method comprising receiving, from a client computer, a first TCP SYN segment comprising a first client TCP sequence number; sending to a server computer a second TCP SYN segment comprising a second client TCP sequence number equal to the first client TCP sequence number less an added data length value; receiving a first TCP SYN ACK data segment and sending a second TCP SYN ACK data segment and determining that connections to the client computer and the server computer have reached established states; receiving from the client computer a first TCP data segment comprising a data length value; forming a second TCP data segment that comprises: payload data from the first TCP data segment; added data that is equal in length to the added data length value; and a second data length value equal to a sum of the first payload data length value and the added data length value; sending the second TCP data segment to the server computer; wherein the method is performed using one or more computing devices.

In yet another embodiment, the disclosure provides a computer system comprising one or more processors; a switching system coupled to the one or more processors and configured to receive data packets on an ingress interface, to determine an egress interface on which to forward the data packets toward a destination from among a plurality of available egress interfaces, and to forward the data packets on the egress interface; one or more non-transitory computer-readable storage media coupled to the one or more processors and storing one or more sequences of instructions which when executed using the one or more processors cause performing receiving, from a client computer, a first handshake message segment comprising a first client sequence value; sending to a server computer a second handshake message segment comprising a second client sequence value equal to the first client sequence value less an added data length value; receiving a third handshake message segment from the client computer and sending a fourth handshake message segment to the server computer and determining that connections to the client computer and the server computer have reached established states; receiving from the client computer a first data segment comprising a first data length value; forming a second data segment that comprises: payload data from the first data segment; added data that is equal in size to the added data length value; and a second data length value equal to a sum of the first data length value and the added data length value; sending the second data segment to the server computer.

One embodiment may be implemented using wire-speed internetworking elements that perform substantive action upon relatively few packets of a flow and perform accounting operations with respect to the vast majority of the packets of the flow. An example is the Cisco Service Control Engine (SCE), commercially available from Cisco Systems, Inc., San Jose, Calif. Other embodiments may be implemented using routers, switches, other internetworking elements, and other computing devices that are interposed between other devices in a network messaging flow.

Any such embodiment may be implemented as a proxy device that terminates a first connection to the client computer and terminates a second connection to the content server computer; however, proxy operation and/or the use of two connections or bilateral stitched connections is not mandatory. Thus, embodiments can be implemented in any situation in which a computing device has been configured to receive a dataset, modify the dataset by adding or removing header data, payload data or other data to or from the dataset, and consuming the modified dataset locally or forwarding the modified dataset elsewhere. Indeed, a benefit of the approaches herein is that they do not require two-way proxying or the stitching of bilateral connections from a proxy box to a client computer and to a server computer.

2. Structural and Functional Examples

FIG. 1 illustrates a network context in which embodiments may be used. A client computer 102 is coupled to a network device 106 within a service provider network 104, which is also coupled to a content server computer 110. Client computer 102 broadly represents any computing device that may need content from content server computer 110, such as a personal computer, workstation, tablet computer, smartphone, or server computer. Service provider network 104 represents any combination of one or more local area networks, wide area networks, internets and the like, and typically represents an internet service provider (ISP). Network device 106 may be any unit of internetworking infrastructure such as a packet data router or switch. Content server computer 110 broadly represents any computer that hosts or can access content that is useful to client computer 102. Content server computer 110 may be associated with a website, video service, music store, document service, or any other form of service that provides content to client computers or end user computers.

Network device 106 hosts message modification logic 108. In an embodiment, message modification logic 108 is configured to implement the techniques that are further described herein in this section, and in connection with FIG. 2, FIG. 3, FIG. 4. In an embodiment, message modification logic 108 may comprise one or more computer programs, other software elements, digital logic, and/or other functional units that are so configured. In an embodiment, message modification logic 108 may form a part of an operating system of the network device 106, such as Cisco IOS Software, commercially available from Cisco Systems, Inc., San Jose, Calif., or an application that is hosted using the operating system.

In an embodiment, message modification logic 108 is configured to perform modification and management, as further described herein, of sequence values in messages that are communicated between client computer 102 and content server computer 110. For example, in one embodiment the client computer 102 and content server computer 110 communicate using internetworking protocols such as HTTP over TCP/IP, using IP packets that contain TCP segments having TCP sequence numbers.

In such an embodiment, as seen in FIG. 1, client computer 102 may form and send a message 120 that carries a TCP sequence number of a particular value, denoted X. In an embodiment, message modification logic 108 is configured to intercept the message 120, since the network device 106 is logically interposed between the client computer 102 and content server computer 110. In some embodiments, network device 106 is configured to terminate a TCP connection at the network device as well as a second TCP connection associated with content server computer 110 and therefore serves as a proxy. In other embodiments, the network device does not terminate connections but may silently or "promiscuously" observe TCP/IP traffic between the client computer and server computer and modify messages in transit.

In any such case, message modification logic 108 is configured to modify the sequence number of message 120 by decrementing a specified value Y that is equal to a number of bytes to be added to the message; thus at the network device 106, message 120 is transformed into message 122 having a sequence number equal to X minus Y. That message 122 is forwarded to content server 110, or the same sequence number is used in a proxied connection to the content server, and in subsequent communications.

Figure 2:
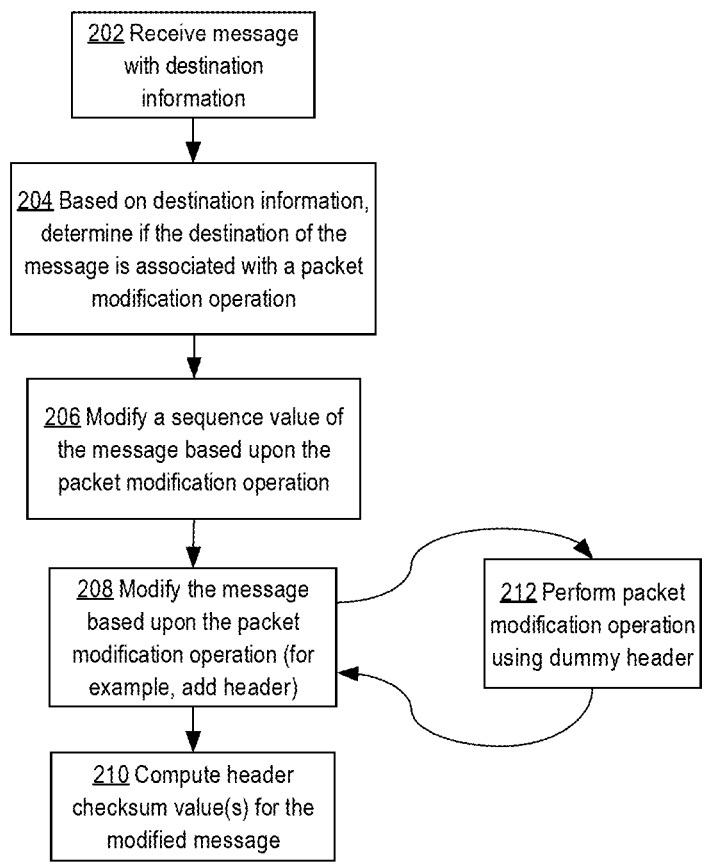
FIG. 2 illustrates one embodiment of a process of managing sequence values with added headers in computing devices.

FIG. 2 illustrates one embodiment of a process of managing sequence values with added headers in computing devices.

At block 202, the process receives a message or request that specifies destination information. In one embodiment, the message comprises an HTTP POST request or an HTTP GET request, but other embodiments may use other kinds of messages. The particular kind of message is not critical. In various embodiments, the destination information used in the process may comprise a destination network address and destination port value in the internet protocol (IP) header of a TCP/IP packet, and/or a uniform resource locator (URL). For example, a URL in a HTTP request may specify a particular content resource that the client computer is seeking to access.

At block 204, based on the destination information, the process determines whether a destination identified in the destination information is associated with a packet modification operation. In various embodiments, a packet modification operation may comprise adding a packet, removing a packet, or performing other modifications. In one embodiment, a computing device that implements the process of FIG. 2 stores, or can access a data repository or other computing device that stores, a mapping of destination information to packet modification information. For example, a stored mapping may comprise a list of URLs and key values, flag values or other indicators that signal whether a header is to be added, whether particular payload values are to be added, or whether or not to perform other packet manipulation operations.

In an embodiment, if the test of block 204 is true, then control transfers to block 206. If the test of block 204 is false, then optionally control ultimately transfers to block 212, which is discussed below.

At block 206, a sequence value proposed during a protocol handshaking sequence is modified based upon a specified or predetermined length of header values that will be added later. For example, in the case of TCP, the TCP sequence number that the client computer proposed in a TCP SYN segment communicated during the TCP three-way handshake conversation is modified. The modified sequence value is determined as the sequence value proposed by the client less the known length of headers to be added later:

deviceProposedSeqNo=sourceProposedSeqNo−lenOfAddedHeaders

At block 208, the message is modified based upon the packet modification operation that was determined. For example, an HTTP GET request or POST request may be modified to add one or more new HTTP headers and header values. As a result, a modified message is created and stored in main memory or otherwise transiently stored.

At block 210, the process computes one or more header checksum values for the modified message. The one or more header checksum values may be updated into the message. A downstream receiving node will receive the additional payload as if it was sent from the transmitting node; thus a receiving server computer cannot determine whether the message has been modified unless the modified headers or data explicitly indicate that the message was proxied.

Thereafter, other packets, segments or messages relating to the same flow do not require modification. Instead, the client computer and the content server computer may communicate according to conventional networking protocols. Indeed, one benefit of the solutions herein is that protocol implementations at the client computer and the content server computer, such as the TCP stack software in each location, do not require modification for compatibility with or to interoperate with the techniques herein.

In an embodiment, at block 212, a dummy header having the specified length may be added. The approach of block 212 is appropriate, for example, when a particular message does not need service differentiation or other special treatment that requires adding a substantive new header, and to permit consistent compensation of the sequence values anyway. In other words, in the approach of block 212, the process always applies compensation to the sequence values even if a header with substantive values is not needed.

Figure 3:
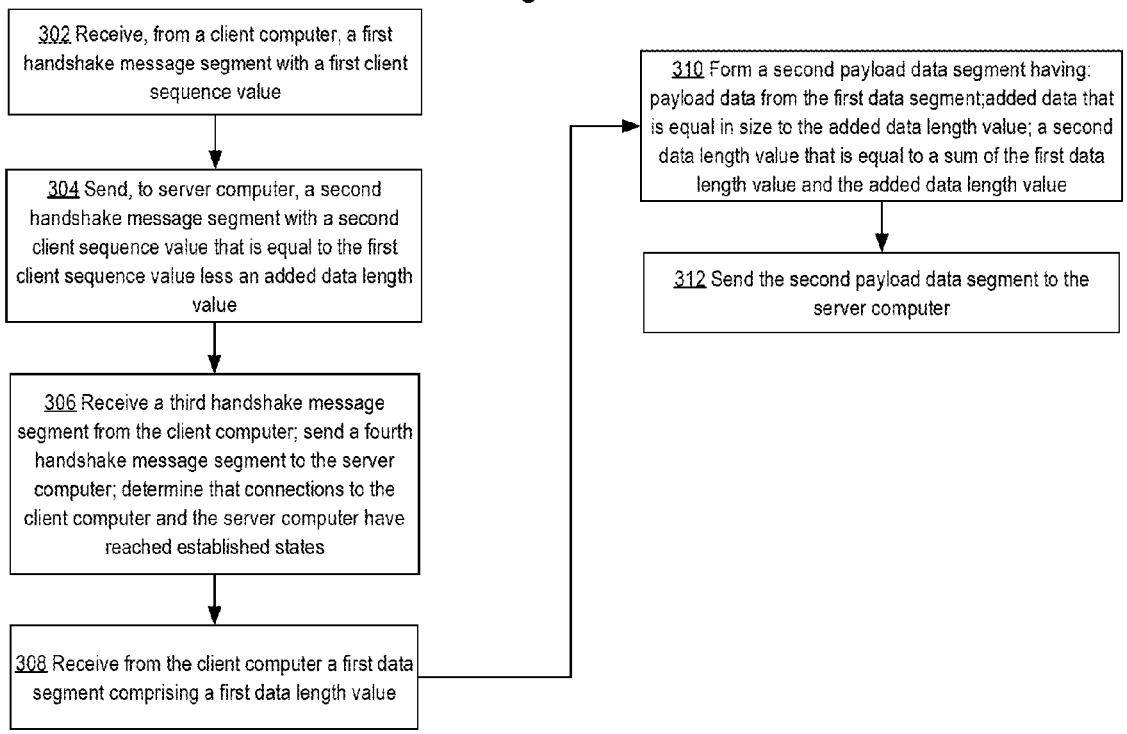
FIG. 3 illustrates another embodiment of a process of managing sequence values with added headers in computing devices.

FIG. 3 illustrates another embodiment of a process of managing sequence values with added headers in computing devices. At block 302, the process receives, from a client computer, a first handshake message segment comprising a first client sequence value. The first handshake message segment may be, for example, a TCP SYN segment.

At block 304, the process sends, to a server computer, a second handshake message segment comprising a second client sequence value equal to the first client sequence value less an added data length value. The second handshake message segment also may be a TCP SYN segment, in one example approach. Unlike prior approaches, block 304 involves modifying the client sequence value that was received in a segment from the client by reducing the client sequence value according to the magnitude of the added data length value, which represents the amount of data that the process will add in a later operation.

At block 306, the process receives a third handshake message segment from the client computer, sends a fourth handshake message segment to the server computer, and determines that connections to the client computer and the server computer have reached established states. The third handshake message segment and the fourth handshake message segment may be TCP SYN ACK segments in one example approach.

At block 308, the process receives from the client computer a first data segment comprising a first data length value. The first data segment may be a TCP data segment.

At block 310, the process forms a second data segment that comprises: payload data from the first data segment; added data that is equal in size to the added data length value; and a second data length value equal to a sum of the first data length value and the added data length value. The second data segment also may comprise a TCP data segment, in which the DLEN data length value received from the client computer at block 308 has been modified by adding back the added data length value.

Figure 4:
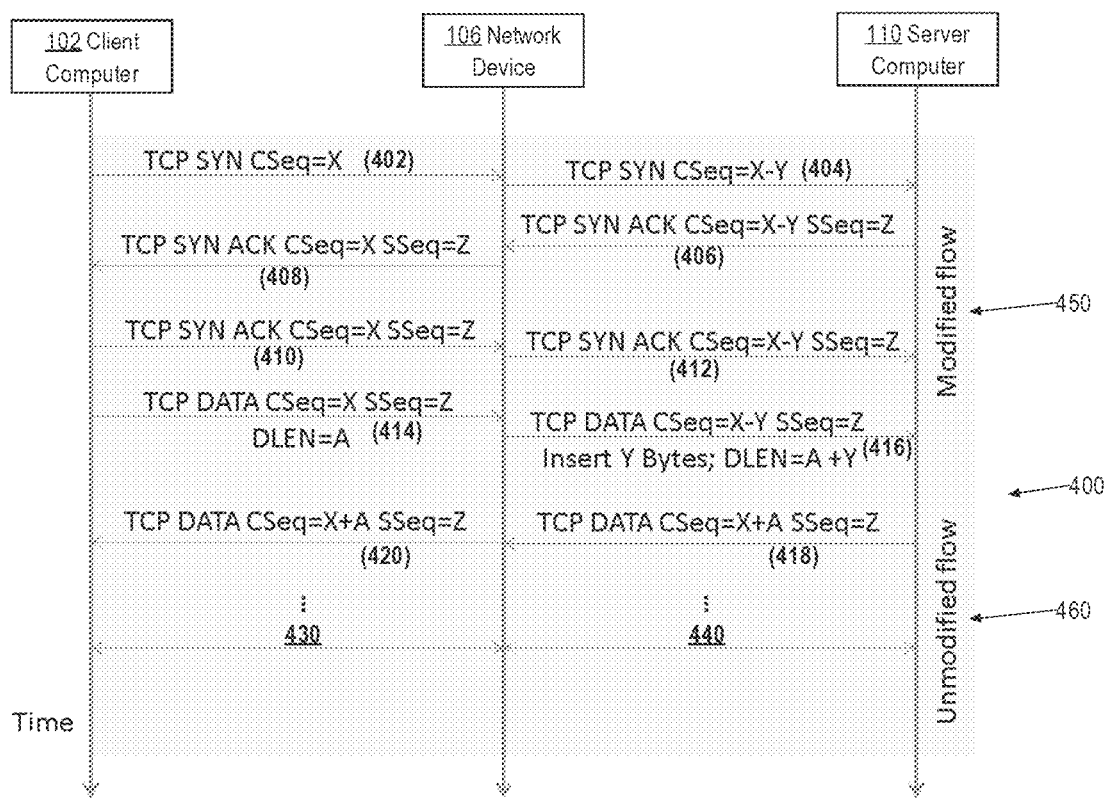
FIG. 4 illustrates example message flows between a client, DPI, and server in one example implementation.

At block 312, the process sends the second data segment to the server computer;

FIG. 4 illustrates example message flows between a client computer, network device, and server computer in one example implementation. In the example of FIG. 4, a message flow 400 comprises a modified message flow 450 and an unmodified message flow 460. In this context, "modified" means not conforming to conventional usage under TCP, and "unmodified" means adhering to the standard TCP protocol. FIG. 4 assumes that a client is conveying a request for content that is held at the server, and that the DPI is located, within a network topology, logically between the client and the server. Messages are communicated at discrete times; the earliest message is at the top of FIG. 4 and time increases along the vertical lines moving downward in the diagram.

At message 402, client computer 102 begins a messaging session with the server computer 110 by sending a TCP SYN segment in which the client sequence number (denoted CSeq in FIG. 4) is set to a first specified value, denoted X in the diagram. The specific value of X is not critical and will vary in each session in which the techniques herein are used.

At message 404, the network device 106 sends a TCP SYN segment onward to the server computer 110 on behalf of the client computer 102. However, unlike the procedure used in standard TCP protocol, in message 404 the client sequence number value is set to X-Y, where X is the sequence number value received from the client in message 402 and Y is the number of bytes in added headers that the DPI later will insert into the data payload. The purpose of inserting bytes into a message or adding headers is not critical and embodiments may support such a function for any technical purpose or business purpose. The client computer 102 is not informed that the client sequence number value X-Y has been sent to the server computer 110 and it is not necessary to do so.

At message 406, the server replies with a TCP SYN ACK segment in which the client sequence number value CSeq is acknowledged as X-Y, and the server sequence number value (denoted SSeq in FIG. 4) is specified as Z. The specific value of Z is not critical and will vary in each session in which the techniques of herein are used.

At message 408, the network device 106 replies to the client computer 102 with a TCP SYN ACK segment in which CSeq is X and SSeq is Z.

At message 410, the client provides an acknowledgement by sending a TCP SYN ACK segment in which CSeq is X and SSeq is Z.

At message 412, the network device 106 sends a TCP SYN ACK segment to the server computer 110 in which CSeq is X-Y and SSeq is Z. At this point, a three-way handshake is complete and two TCP connections have reached the ESTABLISHED state. The first connection is between the client computer 102 and network device 106, and the second connection is between the network device and the server computer 110.

At message 414, the client sends a TCP DATA segment with CSeq set to X and SSeq set to Z, and with a data payload having a length indicated in a data length value (DLEN) of A bytes. A, of course, may be any value up to the maximum permitted data payload value that the network has established.

At message 416, the network device 106 sends a TCP DATA segment onward to the server computer 110, in which CSeq is X-Y, and SSeq is Z. The DPI also inserts a header or data payload data in a quantity of Y bytes, and asserts DLEN as the sum of A+Y. Thus, the TCP DATA segment that is sent to the server computer 110 includes the data that the client provided and added data that the network device 106 has inserted. Moreover, the network device 106 has modified the DLEN and CSeq value to reflect the addition of Y bytes. The fact that Y bytes have been added, however, does not need to be announced explicitly in some way either to the server computer 110 or to the client computer 102.

At message 418 the server computer 110 communicates to the network device 106 a TCP DATA segment in which the client sequence number has been updated to the sum X+A, and the SSeq is Z.

At message 420, the network device 106 sends a TCP DATA segment in which CSeq is the sum of X and A, and SSeq is Z.

Thereafter, the client and server may exchange TCP DATA segments in the same manner without further modification of the protocol or sequence number values, as indicated by arrows 430, 440.

Using this approach, the network device 106 may be configured to silently insert header data or payload data into a message originating from the client computer 102 and directed to the server computer 110, without requiring management of the CSeq value held at the client computer 102 or the SSeq value held at the server computer 110. In particular, the network device 106 does not need to inform the client computer 102 or server computer 110 that the network device will be inserting data into the headers or payloads of TCP segments that the client and server exchange.

Moreover, there is no need for modification of the operating system, network stack or other software at the client computer 102 or server computer 110 that implement TCP. Instead, the TCP implementations at the client computer 102 and server computer 110 may remain unmodified and may operate according to standards. The network device 106 is the sole functional unit involved in non-standard TCP operation and solves the problem identified in this disclosure by silently decrementing the client sequence number by a number of bytes that the network device will insert into DATA segments later in the transmission.

Embodiments do not require all packets of a flow to arrive at the network device 106 in the network 104 between the client computer 102 and the content server computer 110. Instead, if all devices in the network 104 are configured with the capabilities described herein, and use the same specified length for added headers, then one message, packet or segment in the flows described herein could arrive at one device, and another could arrive at a different device without adverse affecting operation of the processes herein.

Embodiments provide the significant benefit that there is no requirement to manage state data identifying which messages, segments or packets are subject to header modification and which are not. Further, there is no need to add the specified added header length value to the sequence numbers of every packet, segment or message. Instead, the sequence numbers of the first few packets involved in handshaking and data exchange are decremented by the added header length; sequence numbers of subsequent packets then do not require any modification.

3. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
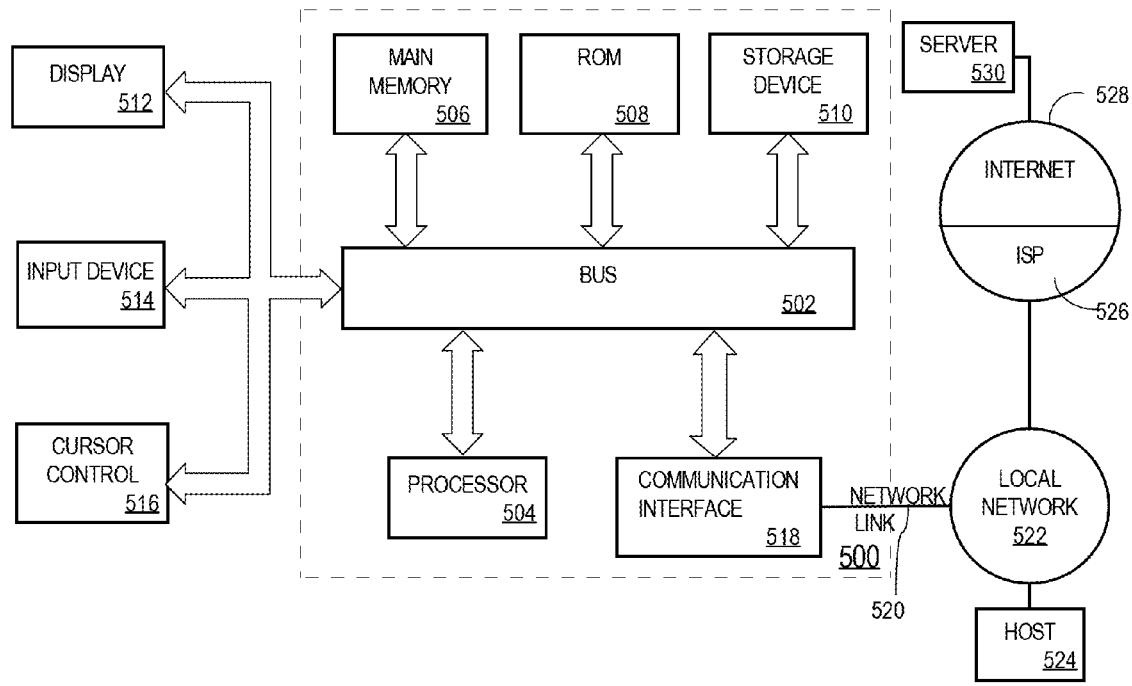
FIG. 5 illustrates a computer system with which an implementation may be used.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A data processing method comprising:
prior to determining that communications connections between a client computer and a server computer have reached established states:
at a network device, receiving, from the client computer, a first handshake message segment comprising a first client sequence value;
sending, from the network device to the server computer, a second handshake message segment comprising a second client sequence value wherein the second client sequence value is computed by subtracting, from the first client sequence value, an added data length value which corresponds to a number of bytes that the network device will add to payloads of data segments once the communications connections to the client computer and the server computer reach the established states and when the data segments are sent from the network device to the server computer via the communications connections;
receiving, at the network device, a third handshake message segment from the client computer, sending a fourth handshake message segment to the server computer, and determining that the communications connections between the client computer and the server computer have reached the established states;
in response to determining that the communications connections between the client computer and the server computer have reached the established states:
receiving from the client computer a first data segment comprising a first data length value;
forming a second data segment that comprises: payload data from the first data segment; added data that is equal in length to the added data length value; and a second data length value equal to a sum of the first data length value and the added data length value;
sending the second data segment to the server computer;
wherein the method is performed using one or more computing devices.

2. The method of claim 1 comprising:
receiving from the client computer a third data segment that comprises a third client sequence value that is greater than a sum of the first data length value, the added data length value, and a third data length value;
sending the third data segment to the server computer without modifying the third client sequence value;2
repeating the receiving and sending of a plurality of times for a plurality of different data segments of the client computer.

3. The method of claim 1 wherein the first handshake message segment is a Transmission Control Protocol (TCP) synchronization (SYN) segment.

4. The method of claim 3 wherein the second handshake message segment is a TCP SYN ACK segment.

5. The method of claim 1 wherein the method is performed using a router that is located logically between the client computer and the server computer in a network topology.

6. The method of claim 1 further comprising:
receiving destination information in the first handshake message segment;
determining whether the destination information indicates a destination that is associated with a packet modification operation;
sending, from the network device to the server computer, the second handshake message segment in response to determining that the destination information indicates a destination that is associated with the packet modification operation.

7. The method of claim 6 wherein the destination information is a URL.

8. The method of claim 6 further comprising adding a dummy header to a proxied payload data segment in response to determining that the destination information is not associated with performing the packet modification operation.

9. The method of claim 6 wherein the added data is a new HTTP header.

10. A data processing method comprising:
prior to determining that communications connections between a client computer and a server computer have reached established states:
at a network device, receiving, from the client computer, a first TCP SYN segment comprising a first client TCP sequence number;
sending, from the network device, to the server computer, a second TCP SYN segment comprising a second client TCP sequence number; wherein the second client TCP sequence value is computed by subtracting, from the first client TCP sequence number, an added data length value which corresponds to a number of bytes that the network device will add to payloads of data segments once the communications connections to the client computer and the server computer reach the established states and when the data segments are sent from the network device to the server computer via the established communications connections;
receiving, at the network device, a first TCP SYN ACK data segment, sending a second TCP SYN ACK data segment to the server computer, and determining that the communications connections to the client computer and the server computer have reached the established states;
in response to determining that the communications connections to the client computer and the server computer have reached the established states:
receiving from the client computer a first TCP data segment comprising a first data length value;
forming a second TCP data segment that comprises: payload data from the first TCP data segment; added data that is equal in length to the added data length value; and a second data length value equal to a sum of the first data length value and the added data length value;
sending the second TCP data segment to the server computer;
wherein the method is performed using one or more computing devices.

11. The method of claim 10 comprising:
receiving from the client computer a third TCP data segment that comprises a third client TCP sequence value that is greater than a sum of the first data length value, the added data length value, and a third data length value;
sending the third TCP data segment to the server computer without modifying the third client TCP sequence value;

repeating the receiving and sending of claim 1 a plurality of times for a plurality of different TCP data segments of the client computer.

12. The method of claim 10 wherein the method is performed using a router that is located logically between the client computer and the server computer in a network topology.

13. The method of claim 10 further comprising:
receiving destination information in the first TCP SYN segment;
determining whether the destination information indicates a destination that is associated with a packet modification operation;
sending, from the network device, to the server computer, the second TCP SYN segment in response to determining that the destination information indicates a destination that is associated with the packet modification operation.

14. The method of claim 13 wherein the destination information is a URL.

15. The method of claim 13 further comprising adding a dummy header to the second TCP data segment in response to determining that the destination information is not associated with performing the packet modification operation.

16. The method of claim 13 wherein the added data is a new HTTP header.

17. A computer system comprising:
one or more processors;
a switching system coupled to the one or more processors and configured to receive data packets on an ingress interface, to determine an egress interface on which to forward the data packets toward a destination from among a plurality of available egress interfaces, and to forward the data packets on the egress interface;
one or more non-transitory computer-readable storage media coupled to the one or more processors and storing one or more sequences of instructions which when executed using the one or more processors cause performing:
prior to determining that communications connections between a client computer and a server computer reach established states:
at a network device, receiving, from the client computer, a first handshake message segment comprising a first client sequence value;
sending, from the network device, to the server computer, a second handshake message segment comprising a second client sequence value; wherein the second sequence value is computed by subtracting, from the first client sequence value, an added data length value which corresponds to a number of bytes that the network device will add to payloads of data segments once the communications connections to the client computer and the server computer reach the established states and when the data segments are sent from the network device to the server computer via the established communications connections;
receiving, at the network device, a third handshake message segment from the client computer and sending a fourth handshake message segment to the server computer and determining that connections to the client computer and the server computer have reached established states;
in response to determining that the communications connections between the client computer and the server computer have reached the established states:
receiving from the client computer a first data segment comprising a first data length value;
forming a second data segment that comprises: payload data from the first data segment; added data that is equal in length to the added data length value; and a second data length value equal to a sum of the first data length value and the added data length value;
sending the second data segment to the server computer.

18. The computer system of claim 17 comprising sequences of instructions which when executed cause performing:
receiving from the client computer a third data segment that comprises a third client sequence value that is greater than a sum of the first data length value, the added data length value, and a third data length value;
sending the third data segment to the server computer without modifying the third client sequence value;
repeating the receiving and sending of claim 2 a plurality of times for a plurality of different data segments of the client computer.

19. The computer system of claim 17 wherein the first handshake message segment is a Transmission Control Protocol (TCP) synchronization (SYN) segment.

20. The computer system of claim 19 wherein the second handshake message segment is a TCP SYN ACK segment.

21. The computer system of claim 17 comprising a router that is located logically between the client computer and the server computer in a network topology.

22. The computer system of claim 17 comprising sequences of instructions which when executed cause performing:
receiving destination information in the first handshake message segment;
determining whether the destination information indicates a destination that is associated with a packet modification operation;
sending, from the network device to the server computer, the second handshake message segment in response to determining that the destination information indicates a destination that is associated with the packet modification operation.

23. The computer system of claim 22 comprising sequences of instructions which when executed cause performing wherein the destination information is a URL.

24. The computer system of claim 22 comprising sequences of instructions which when executed cause adding a dummy header to a proxied payload data segment in response to determining that the destination information is not associated with performing the packet modification operation.

25. The computer system of claim 22 wherein the added data is a new HTTP header.

* * * * *